United States Patent  [15] 3,698,460
Ashton et al.  [45] Oct. 17, 1972

[54] FOOD GRATER

[72] Inventors: Harold P. Ashton, Providence; James B. Swett, Barrington, both of R.I.

[73] Assignee: Dart Industries Inc., Los Angeles, Calif.

[22] Filed: Dec. 30, 1970

[21] Appl. No.: 102,623

[52] U.S. Cl. ..............................................146/180
[51] Int. Cl. ...............................................A23n 15/00
[58] Field of Search...............146/177, 178, 179, 180

[56] References Cited

UNITED STATES PATENTS 3,416,584  12/1968  Rowley..................146/180 X

Primary Examiner—Willie G. Abercrombie
Attorney—Leigh B. Taylor, Michael L. Dunn, Paul R. Wylie and Harold R. Beck

[57] ABSTRACT

A Food Grater including a unique bowl having at least one handle and at least one flattened planar portion at the side of the bowl. The outermost extent of the handle is in the same plane as the flattened planar portion so the bowl can be held in a tilted position and rested on the outermost extent of the handle and the planar portion without rolling. The bowl is also provided with spaces to accept projections on a mating grater element so that the grater element will not rotate on the bowl when the grater is being used.

The grater element is divided into separate grating surfaces, some of which are in separate parallel planes. The separation helps prevent the fingers from being scraped on a nearby unused surface. The grater blades on some of the surfaces face in opposite directions from the grater blades on other surfaces so that a portion of the blades can be used when the grater element is in one position and the remainder can be used when the element is inverted. A unique plastic slicer is provided which has a substantially sinusoidal edge which permits the plastic slicer to be used where metal slicers were formerly required.

6 Claims, 9 Drawing Figures

INVENTORS.
HAROLD P. ASHTON
JAMES B. SWETT
BY
Michael L. Dunn
ATTORNEY

INVENTORS.
HAROLD P. ASHTON
JAMES B. SWETT
BY Michael L. Dunn
ATTORNEY

INVENTORS.
HAROLD P. ASHTON
JAMES B. SWETT

BY Michael L. Dunn

ATTORNEY

INVENTORS.
HAROLD P. ASHTON
JAMES B. SWETT
BY
Michael T. Dunn
ATTORNEY

FOOD GRATER

BACKGROUND OF THE INVENTION

1. Field of the Invention

This invention relates generally to food graters and relates more particularly to an improved food grater manufactured from plastic material.

2. History of the Prior Art

In the prior art, food graters were generally made of ferrous or other metallic materials. Graters made of metallic materials were generally unsatisfactory in that the grater would rust or corrode thus destroying the cutting edges, making the grater unpleasant to look at, causing the grater to deposit corroded particules in the food and permitting the grater to harbor bacteria in the corroded surface. Metallic graters likewise inherently had extremely sharp cutting and scraping edges which frequently ripped and cut the fingers upon even light contact of the fingers with the grating or cutting surface. Metallic graters likewise had a tendency to stick to foods such as cheese making the food hard to slice or grate and making the grater difficult to clean.

In order to avoid some of the disadvantages of metallic graters, attempts were made to replace metallic graters with plastic graters. These attempts were only partially successful because it was believed in the prior art that a plastic grater could not be provided with a slicer having a plastic edge which would be as effective as a metallic slicer.

In addition, both metallic and plastic prior art food graters had other disadvantages. The graters were not generally provided with mating bowls to collect the sliced or grated material and those that had mating bowls did not engage the bowls in a way which prevented rotation or other motion by the grater element when it was being used and the bowls could not be tilted when the grater element was being used without rolling upon the working surface.

Some food graters in the prior art and particularly those provided with collecting bowls were also hard on fingers because it was easy to scrape the fingers on a nearby grating surface while a different grating surface was being used.

BRIEF DESCRIPTION OF THE INVENTION

The invention is a food grater which is made of plastic materials. The grater is provided with a plastic bowl which may be of any suitable plastic material and a grater element which is preferably manufactured from ABS and which snaps onto the bowl in a manner which prevents rotation of the grater element on the bowl. The plastic grating areas which may be substantially planar do not readily stick to the materials which are grated and are therefore easily cleaned. The bowl is provided with at least one outwardly extending handle portion which in conjunction with at least one flattened portion of the bowl permits the bowl and grater element to be tilted in a relatively stable position which prevents the bowl from rolling on the working surface. The handle can also rest on the working surface with the bowl below the edge of the surface which permits the bowl to be stably held against the edge of the working surface.

The grater element may have a plurality of grating or cutting areas which may be in different planes or may face in opposing directions. The use of grating areas which are in separate planes or which face in opposing directions permits the areas to be separated to minimize scrapes and cuts on the fingers which result from accidentally scraping against other grating areas.

The grater is provided with a slicer blade and grater blades which are made entirely of plastic materials and are preferably ABS. The plastic slicer blade has a unique edge in the shape of a sinusoidal curve which permits good slices of food to be obtained and which permits long wear.

PREFERRED EMBODIMENT

Figure 1:
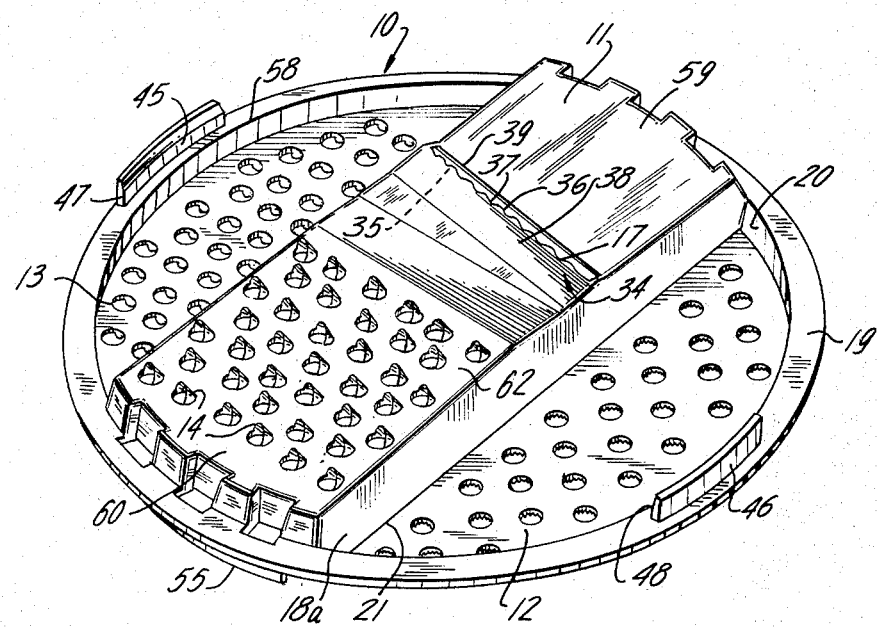
FIG. 1 is an exploded top perspective view showing the bowl and grater element.
Figure 1:
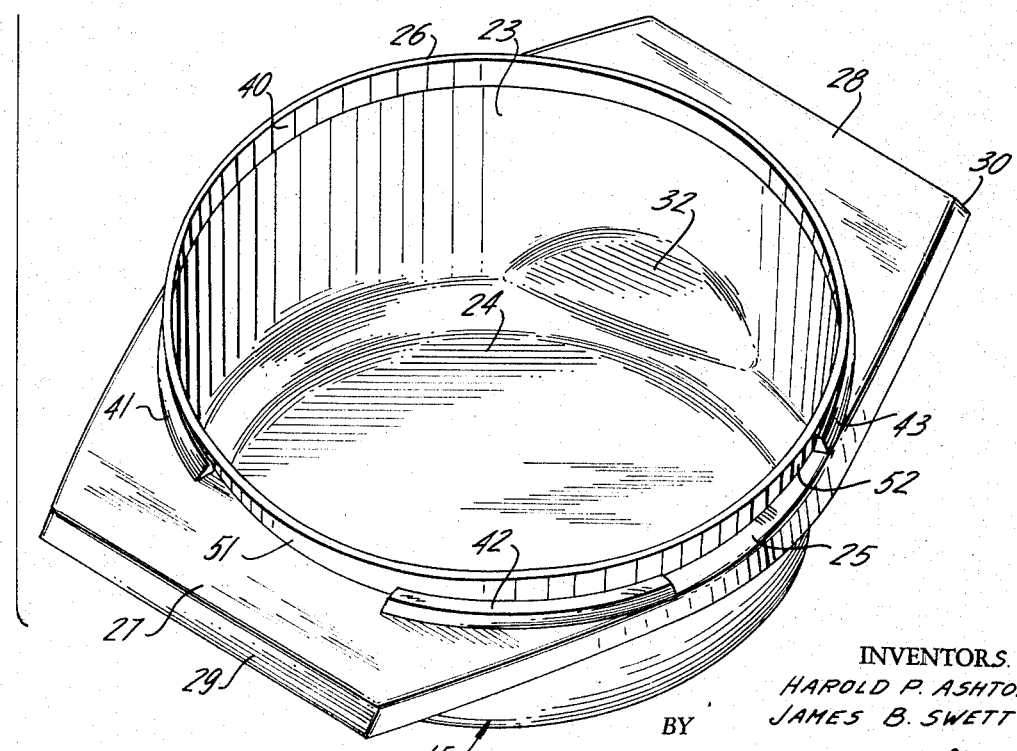
Figure 2:
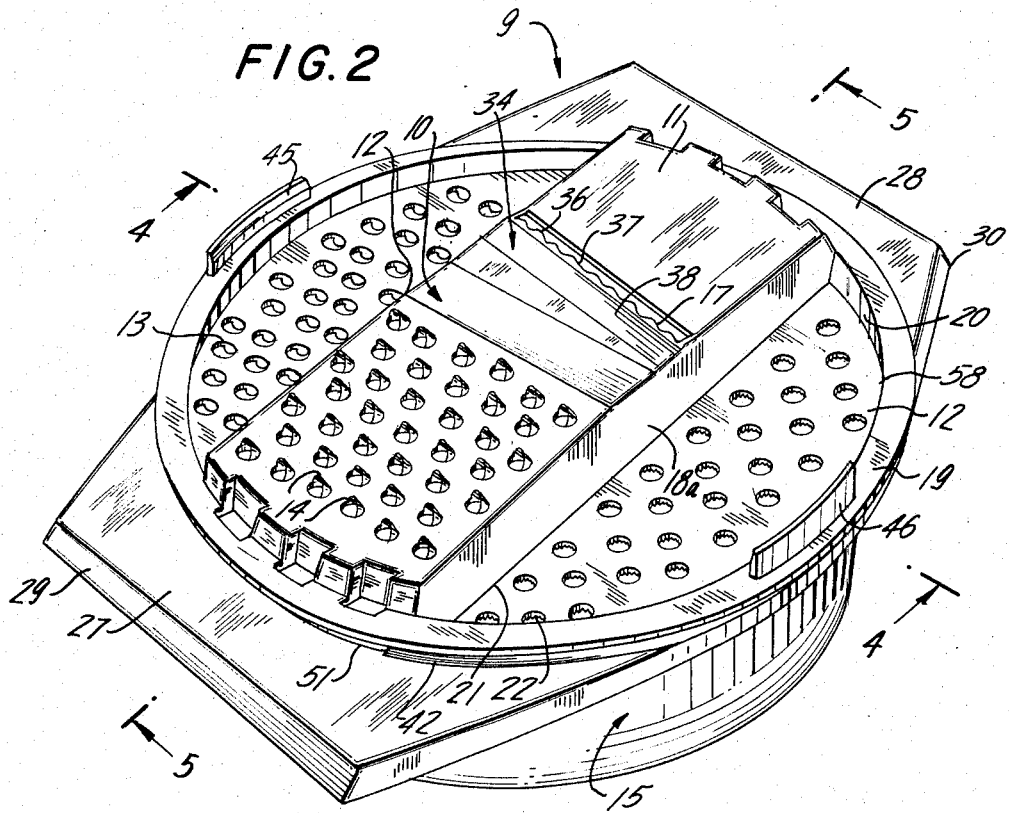
FIG. 2 is a top perspective view showing the grater element assembled upon the bowl.

Referring now to the drawings and particularly FIGS. 1, 2, 3, 4 and 5, food grater 9 is provided with a bowl 15 and a mating reversible grater element 10. Materials which are grated will pass through element 10 and be collected in bowl 15.

Grater element 10 includes at least first and second and preferably a third separate grating walls 11, 12 and 13. First wall 11 is in a different mathematical plane, than the remaining walls 12 and 13. First and second walls 11 and 12 are connected by at least one supporting sidewall 18a and first and third walls 11 and 13 are connected by at least one supporting sidewall 18b. Grating walls 11, 12 and 13 are provided with grating surfaces 62, 63 and 64 respectively.

The grater blades 14 on all grating surfaces project outwardly and when blades 14 on surface 62 of wall 11 project upwardly blades 14 on surfaces 12 and 13 project downwardly so that when food grater element 10 is inverted the plane of walls 12 and 13 is elevated with respect to the plane of wall 11 and grater blades 14 on walls 12 and 13 project upwardly. Two features help to prevent the fingers from being scratched or cut upon nearby grating or cutting areas. Since the grating areas are in different planes, the fingers will not easily contact another grating wall and even if another grating wall is contacted, the chance of being cut or scraped is minimized since the grating areas face in opposing directions, thus the relatively smooth side of the grating wall rather than the grating or cutting portion of the grating wall is likely to be contacted.

Reversible food grater element 10 is preferably defined by an annular outwardly extending flange 19 and a sidewall 20 which downwardly extends from the inner edge 58 of flange 19. Preferably grating walls 12 and 13 are integral with sidewall 20 except for grater blades 14 are substantially planar and may be circular segments. Each wall 12 and 13 has a defining edge 21 and 22 which may be the cord of a circle which cord is shorter than the diameter of element 10 if element 10 is circular and which defining edge is substantially parallel to and spaced from the defining edge of the remaining wall 12 or 13.

In the preferred embodiment, the outwardly extending flange 19 of the grater element is provided with undercut outwardly extending projections 45 and 46 and undercut projections 55 and 25, which extend outwardly in a direction opposed to the direction of extension of projections 45 and 46. Outwardly extending projections 55 and 56 are adapted to snap over a peripheral rim on the bowl, each within one of the spaces 51, 52, 53 and 54 provided on the bowl and projections 45 and 46 are likewise adapted to snap over rim 40 within one of the spaces 51, 52, 53 and 54 when grater element 10 is inverted. The advantage of this structure is that grater element 10 is securely held to bowl 15 and is not permitted to rotate on the bowl. In addition, element 10 may be removed, rotated and secured to the bowl in a different position by snapping the projections into different spaces to obtain a more advantageous grating angle in relation to the bowl for the particular material being grated and for the particular working surface upon which the bowl rests.

The bowl 15 preferably comprises a bottom wall 24 and an integral sidewall 23 which may be linear or curved and is preferably closed and circular. In the preferred embodiment, sidewall 23 is provided with an outwardly flared upwardly extending peripheral rim 40 proximate top edge 26 of sidewall 23. The sidewall may be further provided with an integral outwardly extending peripheral flange 25 proximate top edge 26 but may be below rim 40, to facilitate the use of the rim to engage grater element 10. Flange 25 is provided with a plurality of integral spaced angular surfaces 41, 42, 43, and 44 which are also integral with rim 40. The ends of the angular surfaces define a plurality of spaces 51, 52, 53 and 54.

Peripheral flange 25 of bowl 15 may form at least one and preferably two handle portions 27 and 28 which are preferably opposed. Each handle portion is provided with an outermost extent 29 and 30 respectively, each outmost extent being at least two points which are equidistant from sidewall 23. Sidewall 23 is provided with at least one and preferably two planar surfaces 31 and 32, one of the outermost extents of one of the handles being in the same mathematical plane as one of the planar surfaces. The other outermost extent of the other handle is in the same mathematical plane as the other planar surface. One of the mathematical planes is represented as working surface 33 as seen in FIG. 6.

Figure 6:
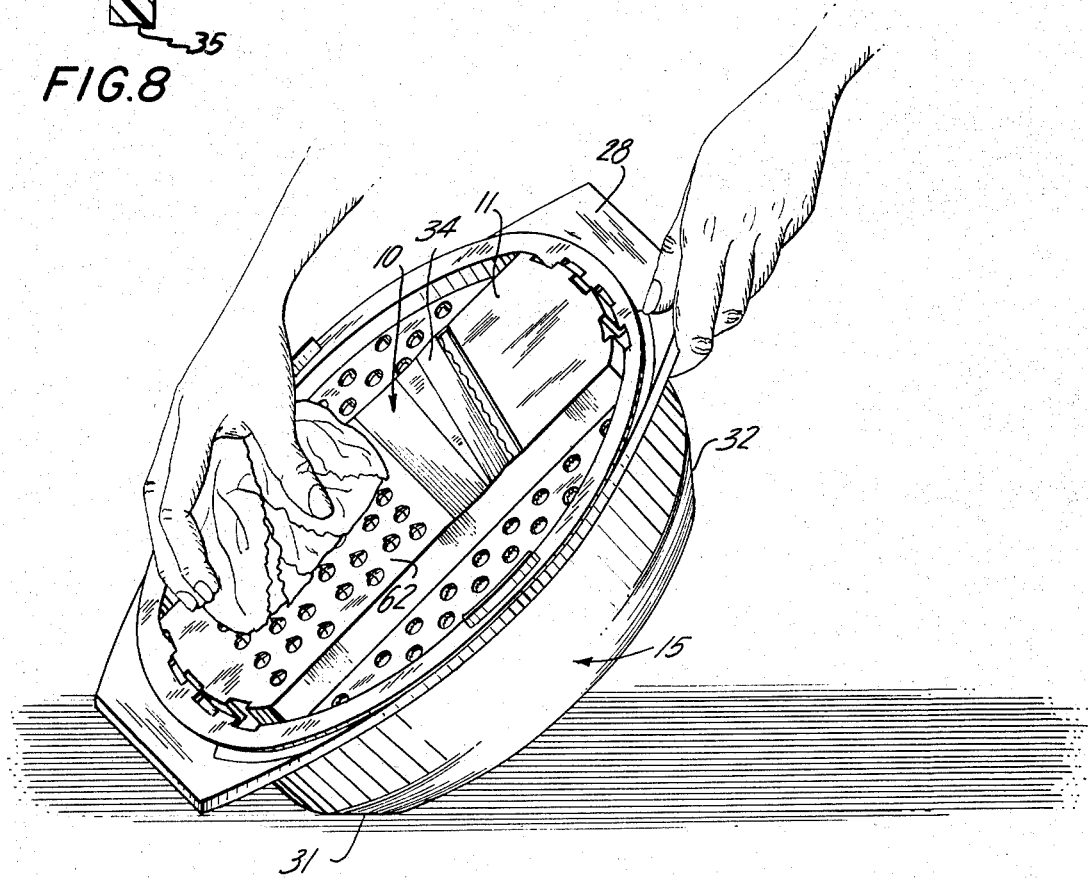
FIG. 6 is a perspective view of the food grater as it might appear during use.

Having the outermost extent of a handle in the same plane as one of the planar surfaces 31 and 32 permits the grater to be held at an angle as shown in FIG. 6, while the grater is being used so that the bowl and grater do not roll upon the working surface.

Figure 5:
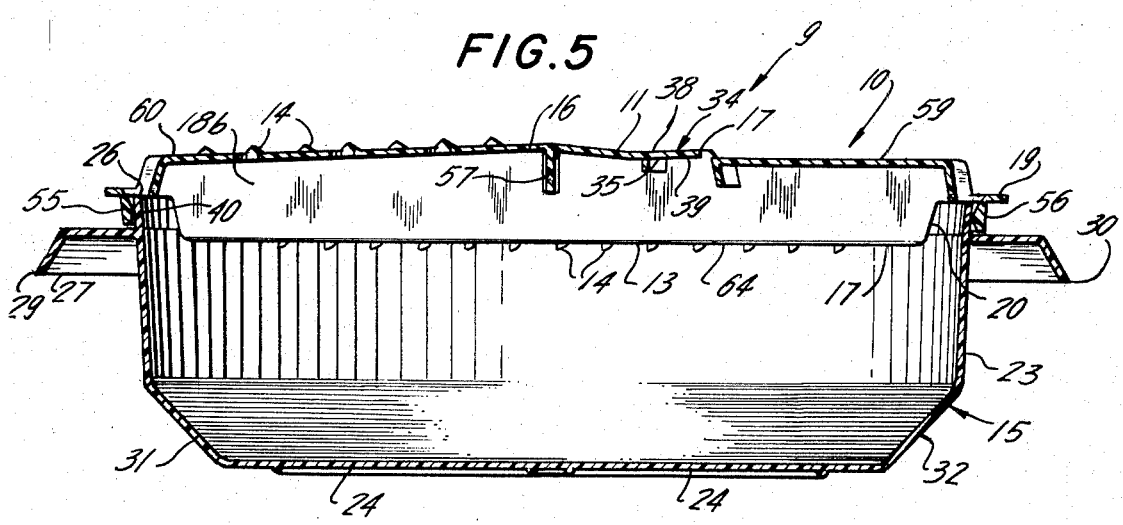
FIG. 5 is a cross sectional view taken on line 5—5 of FIG. 2.
Figure 3:
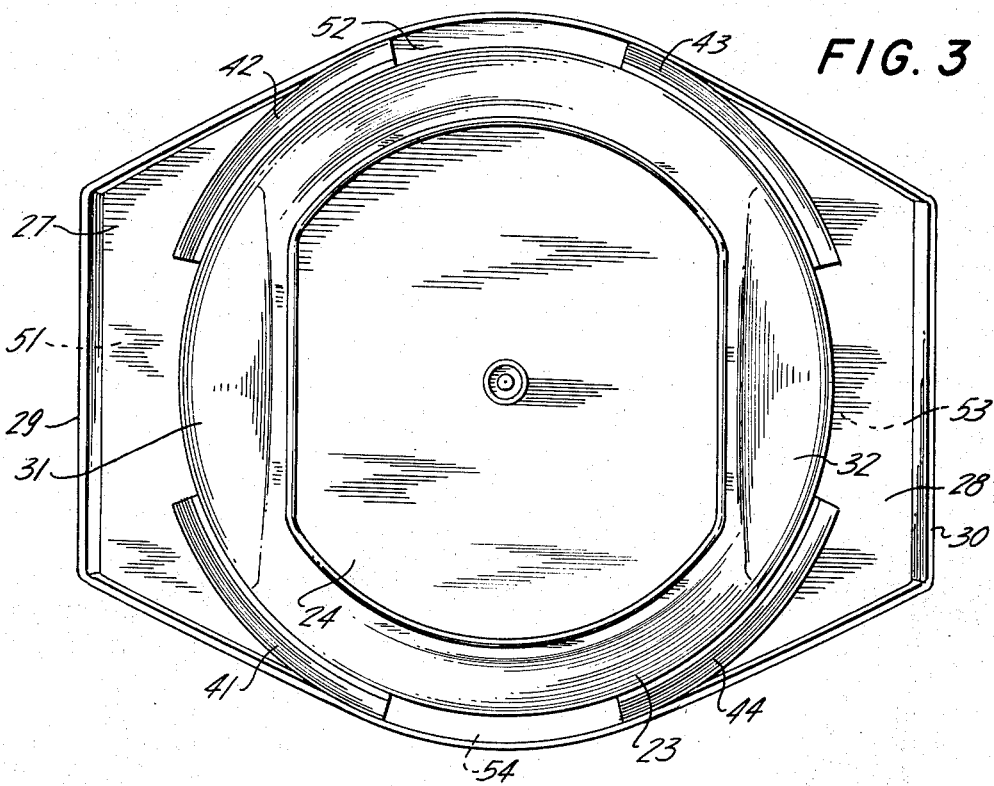
FIG. 3 is a bottom plan view of the bowl.
Figure 4:
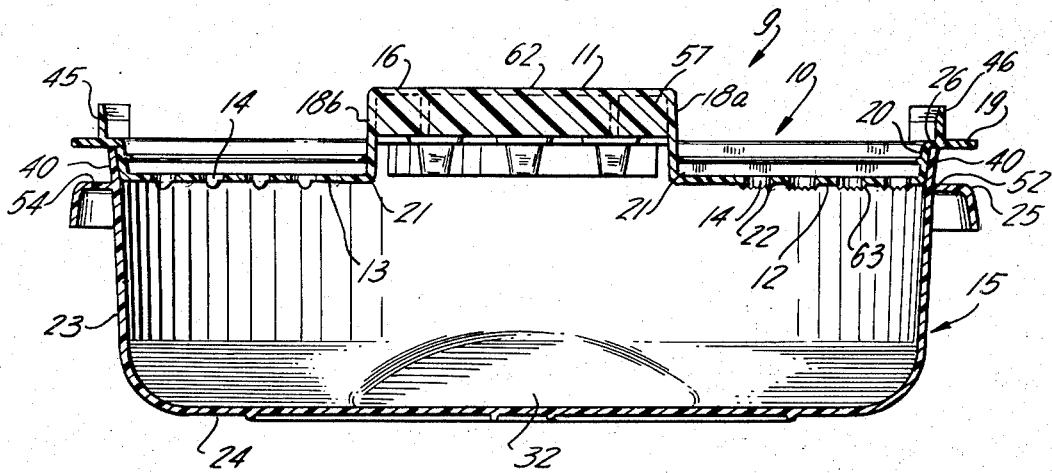
FIG. 4 is a cross sectional view taken on line 4—4 of FIG. 2.

In the preferred embodiment, as best seen in FIG. 5, first grating wall 11 is provided with a slight central peak 16 which divides wall 11 into two sections 59 and 60. The separation of wall 11 by peak 16 reduces the likelihood that the fingers will be scraped upon a section that is not being used. A re-enforcing wall 57 is integral with sections 59 and 60 at peak 16 and helps to support the sections.

Figure 7:
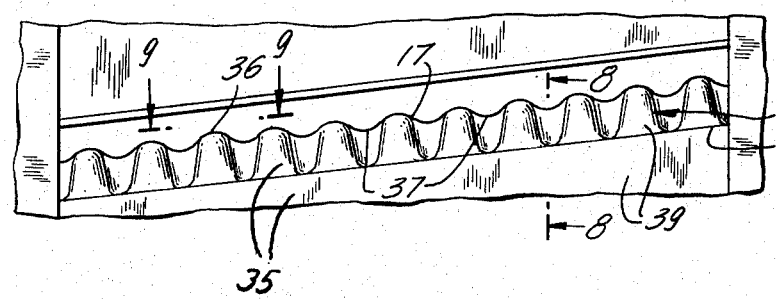
FIG. 7 is an exploded bottom plan view of the slicer blade.
Figure 9:
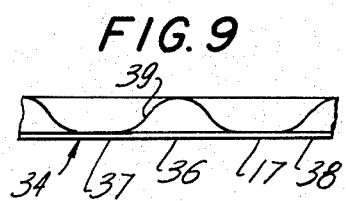
FIG. 9 is a view of the edge of the slicer taken along line 9—9 of FIG. 7.
Figure 8:
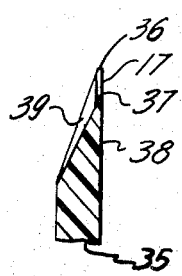
FIG. 8 is a cross sectional view of the slicer blade along line 8—8 of FIG. 7.

As seen in FIGS. 1 and 5, grating element 10 is provided with a plastic slicer 34 which is preferably on one of the sections 59 and 60, at an angle of from about 60° to about 85° from the longitudinal axis of the section. The angle increases slicing efficiency as does the slight upward angle of the element from about 5° to about 20° from the surface of the section. Plastic slicer 34 is provided with a cutting edge 17 and a supporting portion 35. As best seen in FIG. 7, cutting edge portion 17 is preferably substantially in the shape of a sinusoidal curve having maximum amplitudes 36 and minimum amplitudes 37. As seen in FIG. 8, the supporting portion 35 is provided with upper and lower surface 38 and 39 respectively which are joined by edge 17. Upper surface 38 is substantially planar and lower surface 39 slants toward uppersurface 38. The slant of the lower surface 39 begins at a substantially straight line 61, seen in FIG. 7, and terminates at the sinusoidal cutting edge 17 best seen in FIGS. 7, 8 and 9. Lower surface 39 slants toward upper surface 38 from line 61 at a lesser angle to upper surface 38 where lower surface 39 is directed toward a portion of cutting edge 17 having a larger amplitude and lower surface 39 directed toward upper surface 38 from line 61 at a greater angle to upper surface 38 where lower surface 39 is directed toward a portion of the cutting edge having lesser amplitude. The resulting lower surface 39 has a scalloped wavy appearance as it slants toward sinusoidal cutting edge 17.

The resulting plastic cutting edge operates effectively and efficiently for a longer period than some metal edges. Metal edges in the prior art actually seem to become dull in less time than the plastic edge herein discussed. The resulting plastic edge efficiently cuts carrots, cheese, potatoes and other foods. It was discovered by the applicants that a long wearing efficient plastic blade resulted when the edge was given a definite thickness of from about 0.005 to 0.02 of an inch. The edge in the preferred embodiment is about 0.01 of an inch thick.

What is claimed is:

1. A food grater comprising:
a bowl including a sidewall and an integral bottom wall, said sidewall being provided with an outwardly flared upwardly extending peripheral rim proximate the top edge of said sidewall, said sidewall being further provided with an integral outwardly extending peripheral flange proximate said top edge, said flange being provided with a plurality of integral spaced angular surfaces which are also integral with said rim and;
a reversible food grater element comprising at least a first and a second grating wall, said first wall being in a plane substantially parallel to the plane of said second wall and being elevated with respect to said second wall, said grating walls being connected by at least one supporting sidewall so that when said food grater element is inverted, said second wall is elevated with respect to said first wall, each of said grater walls being integral with a peripheral sidewall, said sidewall being integral with an annular supporting flange said flange having a plurality of first undercut outwardly extending projections and a plurality of second undercut outwardly extending projections which project in a direction opposite the direction of extension of said first projections, said outwardly extending projections being adapted to snap over said outwardly flared rim within the spaces between said angular surfaces and said second outwardly projections being likewise adapted to snap over said outwardly flared rim between said angular surfaces when said grater element is inverted.

2. A reversible food grater element comprising at least first, second and third grating walls, said second grating wall being integral with first upwardly extending sidewall, said third grating wall being integral with a second upwardly extending sidewall, the upper edges of said sidewalls being joined by said first grating wall which separates said second and third grating walls and which is elevated by said sidewalls above said second and third grating walls, said food grater element being reversible so that when said element is reversed, said second and third grating walls will be elevated with respect to said first grating wall.

3. A reversible food grater element comprising first, second and third grating walls, said grater element being defined by an outwardly extending flange, a sidewall downwardly extending from the inner edge of said flange, said second and third walls being separate grating walls integral with said sidewall each having a defining edge substantially parallel to and spaced from the defining edge of said other grating wall, a supporting wall upwardly extending from an integral with each of said grating walls proximate said defining edge, said supporting walls being connected by said first grating wall, said first grating wall being elevated upon said supporting walls with respect to said second and third grating walls, said first grating wall having grater blades facing upwardly and second and third grating wall having grating blades facing downwardly so that when said grater element is inverted, said second and third grating walls will be elevated with respect to and separated by said first grating wall and the grating edges of said second and third grating walls will be facing upwardly.

4. A reversible food grater element comprising an outwardly extending peripheral flange, and first, second and third grating walls, a sidewall downwardly extending from the inner edge of said flange, said second and third grating walls being integral with said sidewall and having substantially parallel spaced defining edges, a supporting wall upwardly extending from and integral with each of said second and third walls proximate said parallel defining edges, said supporting walls being connected at their upper ends by said first grating wall, said first grating wall being in a plane substantially parallel with said second and third walls and being elevated upon said supporting walls with respect to said second and third grating walls, said first grating wall having grater blades facing outwardly and said second and third grating walls having grater blades facing outwardly in a direction opposed to the outwardly direction of the blades on said first wall so that when said grater element is inverted, said second and third grating walls will be elevated with respect to and separated by said first grating wall and the grater blades of said second and third walls will be facing upwardly.

5. The food grater element claimed in claim 4 wherein said first grating wall is provided with a slight peak which divides the wall into two sections and is further provided with a cutting edge on one of the sections and grater elements on the other of the sections.

6. A generally circular reversible food grater element comprising a circular outwardly extending flange, and first, second and third grating walls, a circular sidewall downwardly extending from the inner edge of said flange, said second and third grating walls being in the shape of circular segments having parallel defining cords, said cords being shorter than the inside diameter of said circular sidewall, a supporting wall upwardly extending from and integral with each of said second and third walls proximate said cord, said supporting walls being connected at their top edges by said first grating wall, said first grating wall being elevated upon said supporting walls, with respect to said second and third grating walls, said first grating wall having grater blades facing upward and said second and third grating walls having grater blades facing downward so that when said grater element is inverted, said second and third grating walls will be elevated with respect to and separated by said first grating wall and the grater blades of said second and third walls will be facing upwardly.

* * * * *